United States Patent [19]

Kennedy

[11] 4,310,028

[45] Jan. 12, 1982

[54] METHOD AND APPARATUS FOR INCREASING THE FLUID THROUGHPUT OF A CONDUIT

[75] Inventor: John H. Kennedy, Sturgis, Mich.

[73] Assignee: Patriark, Inc., Albuquerque, N. Mex.

[21] Appl. No.: 780,860

[22] Filed: Mar. 24, 1977

Related U.S. Application Data

[63] Continuation of Ser. No. 567,827, Apr. 14, 1975, abandoned.

[51] Int. Cl.[2] ............................................. F15D 1/02
[52] U.S. Cl. .................................... 138/39; 48/180 C
[58] Field of Search ................ 138/39, 37; 48/108 C, 48/108 A, 108 R; 259/4 A

[56] References Cited

U.S. PATENT DOCUMENTS

| | | | |
|---|---|---|---|
| 3,113,593 | 12/1963 | Vicard | 138/39 |
| 3,351,091 | 11/1967 | Chambert | 138/39 |
| 3,381,713 | 5/1968 | Jacobsen | 138/39 |
| 3,671,208 | 6/1972 | Medsker | 48/180 C |
| 3,820,570 | 6/1974 | Holzhuter | 138/39 |

Primary Examiner—Willis Little
Attorney, Agent, or Firm—Gordon W. Hueschen

[57] ABSTRACT

The fluid throughput of a conduit is increased without increasing the power requirements or the size of the conduit by affixing to the inner surface of the conduit at least one airfoil located with its leading edge facing into the flow substantially at the beginning of rectilinear flow. The airfoil advantageously has a body portion, a head portion, and a tail portion wherein the body portion has upper and lower planar surfaces defined by substantially parallel planes, side portions defined by substantially parallel side planes which are substantially normal to the upper and lower parallel planes, the head portion has a bulbous portion extending substantially below the lower parallel plane and the tail portion extends substantially below the lower parallel planes but not as far below as the bulbous portion.

17 Claims, 5 Drawing Figures

U.S. Patent     Jan. 12, 1982     4,310,028
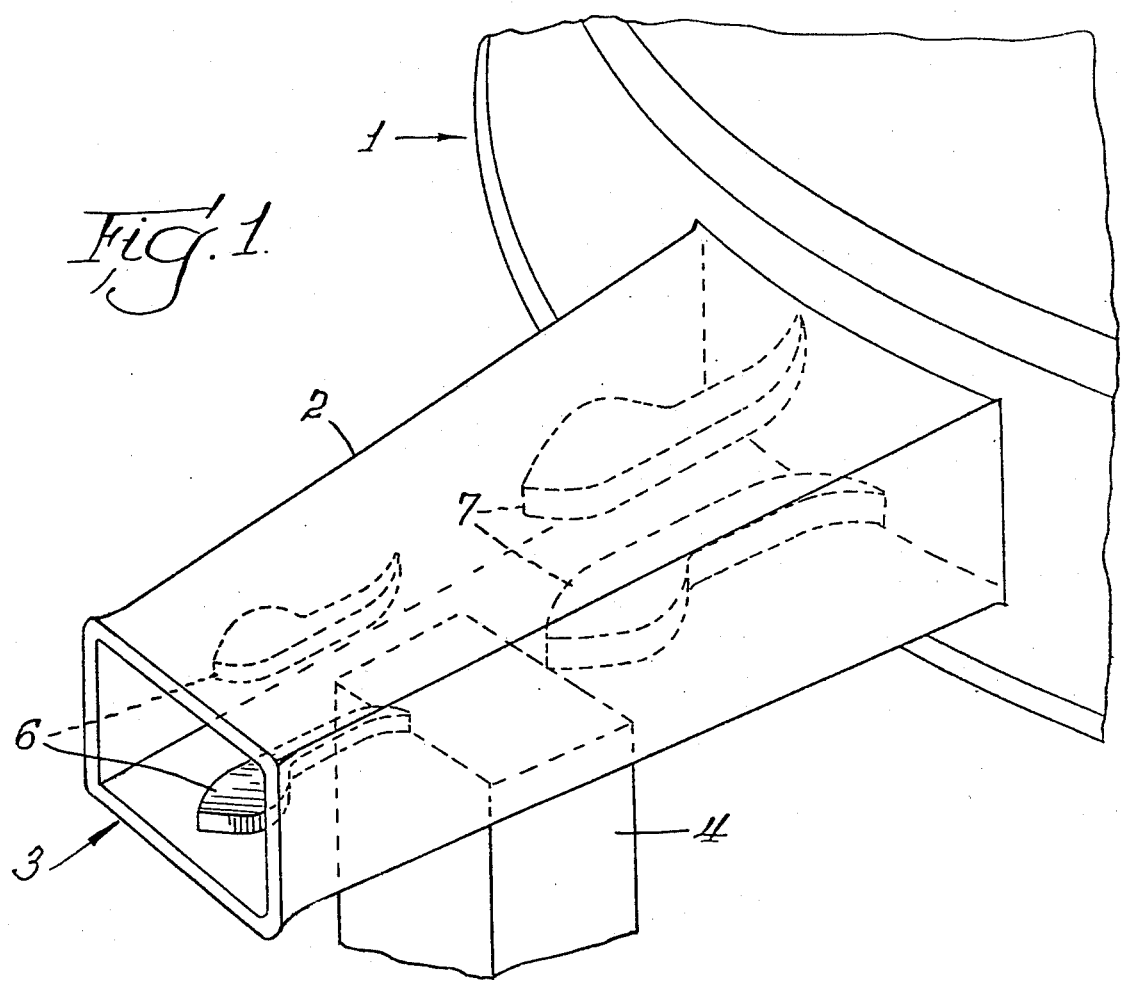
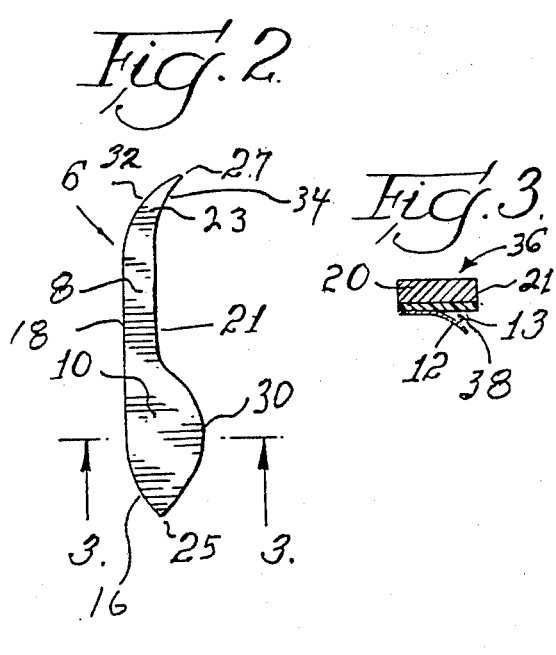
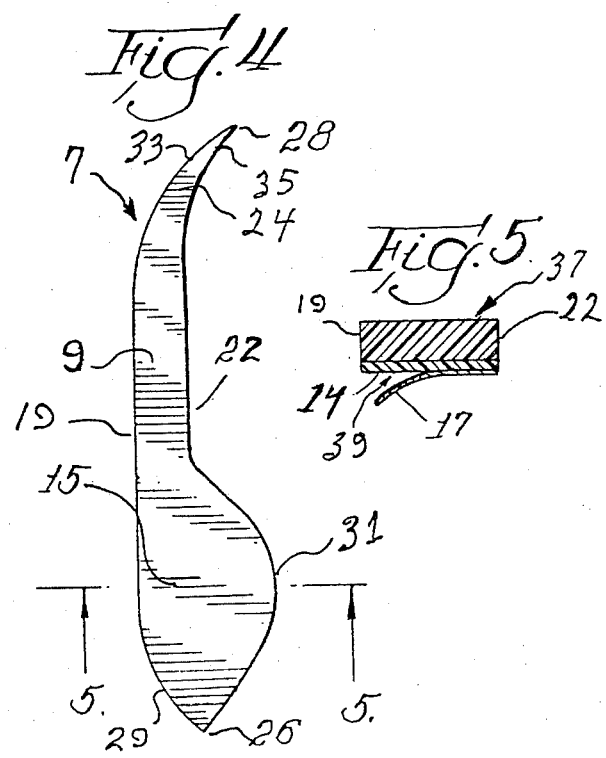

METHOD AND APPARATUS FOR INCREASING THE FLUID THROUGHPUT OF A CONDUIT

This is a Continuation of application Ser. No. 567,827, filed Apr. 14, 1975, now abandoned.

BACKGROUND OF THE INVENTION

The invention relates to method and apparatus for increasing the fluid flow-through in a conduit without increasing the power requirements or the size of the conduit.

A fluid mixing apparatus employing airfoils affixed to the inner surfaces of conduits is disclosed in U.S. Pat. Ser. No. 3,671,208. The shape and location of the airfoils in this patent, however, while well adapted for the disclosed purpose, namely, fluid mixing, are not optimum for increasing the fluid through-put of the conduit without increasing the power requirements or the size of the conduit.

OBJECTS

It is an object of the invention to provide a method and apparatus which avoids the disadvantages of the prior art and makes possible an increase of fluid throughput in a conduit without increasing the power requirements or increasing the size of the conduit. Other objects will appear as the description proceeds.

SUMMARY OF THE INVENTION

The present invention relates to a method and apparatus for increasing the fluid throughput of a conduit by affixing to the inner surface of the conduit at least one airfoil of an improved design and in a particular location in the conduit. The airfoil used in the present invention has a body portion, a head portion, and a tail portion, bounded by parallel side planes. The body portion has upper and lower planar surfaces defined by substantially parallel upper and lower parallel planes. The lower plane will be referred to herein as the base plane. The head portion has a bulbous portion extending below the base plane a substantial distance and the tail portion also extends below the base plane a substantial distance but not so far as the bulbous portion. The upper plane surface slopes from the planar part to the leading edge in a convex curve and the lower surface slopes downwardly from the planar portion and then upwardly to the leading edge in a bulbous curve. The upper and lower surfaces also slope downwardly from the planar portion to the trailing edge in convex and concave curves, respectively. The distance between the upper and lower parallel planes is, advantageously, substantially the same as the distance between the parallel side planes. The upper surface slopes to the leading edge at an angle of about 30° to about 40° and the lower surface slopes to the leading edge at an angle of about 30° to about 40°. The head portion is about ⅔ the overall length of the airfoil and is about twice as long as it is wide. The distance from the bottom of the bulbous portion to the base plane is about ⅔ of that from the bottom portion of the bulbous portion to the upper plane. The airfoil is located with its base plane in the direction of flow but can be canted at an angle, say, up to 15°. The leading edge is substantially in the base plane but may be slightly above. In fact, where a plastic such as polystyrene is employed, the leading edge, as cast or molded, should be slightly above the lower plane, say about 5° above, as molecular re-adjustment in the cast product may take place bringing the leading edge substantially into the lower base plane. The lengths referred to herein are determined as projections on the base plane and the widths, as projection on a plane normal to the base plane. The size and thickness of the foil is such that the foil does not project into the conduit more than about 1/5 the diameter of the conduit at the point where the foil is affixed. It will be understood that the measurements given are not firm but that they may be varied up to about 15 percent, plus or minus.

If fluid is being taken into an open ended conduit, the leading edge of the foil should be placed at the open end. If the conduit has a flared opening, the foil should be placed back into the conduit to the point where it begins to flare. The reason for this is that the leading edge of the foil should be in contact with the fluid when it begins rectilinear flow. Hence, if there is a bend in the conduit, a foil should be placed just after the bend, that is, where the flow again becomes rectilinear. The same applies if there is an inlet into the conduit, that is, the foil should be placed just after the inlet, where the flow again becomes rectilinear. Thus, it may be necessary and desirable to place more than one foil along the length of a conduit. Even where the flow is throughout rectilinear, it is desirable to have additional foils every 25 or 30 unit lengths, so as to re-inforce the effect initiated by the foil at the beginning of the rectilinear flow, a unit length being the overall length of the airfoil.

The foils may be placed in the intake conduit of the air cleaner of an automobile. One or more should be placed at the immediate inlet and one or more just after the hot air intake. The effect is that of a supercharger to increase the flow of air into the carburetor.

To simplify the installation of the airfoil, one of the side surfaces may be coated with a pressure sensitive adhesive covered with a protective sheet, so that when the sheet is stripped off, the foil may be positioned in the conduit and secured therein simply by pressing it in place.

BRIEF DESCRIPTION OF THE DRAWINGS

In the drawings:
FIG. 1 is an isometric view showing the location of the airfoils in an air filter of an automobile.
FIG. 2 is a plan view of a small airfoil.
FIG. 3 is a cross section of FIG. 2.
FIG. 4 is a plan view of a larger airfoil.
FIG. 5 is a cross section of FIG. 4.

DETAILED DESCRIPTION OF THE INVENTION

In the particular embodiment of the invention illustrated in the drawings, 1 represents an air cleaner of an automobile, 2 the air intake conduit of the air cleaner 3 the flared out intake portion of the intake conduit, and 4 the hot air inlet to the air intake conduit. Six represents small airfoils located adjacent the cold air intake. Seven are larger airfoils located farther in the intake conduit and just after the hot air intake 4.

Referring now to FIGS. 2, 3, 4, and 5, the airfoils 6 and 7 have body portions 8 and 9, and tail portions 23 and 24. The head portion has a leading edge 25, 26 and the tail portion a trailing edge 27, 28. The body portion has a top planar surface 18, 19 and a bottom planar surface 21, 22 which are defined by substantially parallel planes. The leading edge 25, 26 is in or slightly above the base plane. The head portion extends substantially below the base plane and the tail portion also extends substantially below the base plane but not so far as the head portion. The upper planar surface 18, 19 slopes downwardly to the leading edge 25, 26 in a convex curve 16, 29. The bottom planar surface 21, 22 slopes downwardly and then upwardly to the leading edge 25, 26 in a bulbous curve 30, 31. The upper and lower planar surfaces slope downwardly to the trailing edge 27, 28 in convex curves 32 and 33 and in concave curves 34 and 35, respectively. The sides 36, 37 and 38, 39 are defined by parallel planes substantially normal to the upper and base planes and are spaced apart substantially the same distance as the distance between the upper and base planes, and the airfoils are proportioned and located as described above.

On one side of the foil is affixed a layer of adhesive 13, 14 which may be of a pressure sensitive type which is covered by a protective sheet 12, 17. When used, the sheet is torn off and the foil is placed in the conduit already described and pressed into engagement there.

Foils of the dimensions given above are particularly suitable for handling air or other gases and give increased throughput efficiencies, up to as much as 40%, without requiring additional power.

The invention may also be adapted to conduits handling liquids, in which case, it is sometimes desirable to use a more elongated foil.

The contour of the foil of this invention approximates a cross section of a jet airplane wing with all the flaps down to insure maximum upward thrust. When the foil so contoured is placed in a conduit at the beginning of rectilinear flow, it sets up a vortex in the tube which immediately is re-oriented 90° to break up turbulence and skin effects in the conduit which would otherwise tend to reduce the throughput. It is to be understood, however, that the invention is not limited to any particular theory of operation.

It is to be understood that the invention is not to be limited to the exact details of operation or structure shown and described as obvious modifications and equivalents will be apparent to one skilled in the art.

I claim:

1. A fluid conduit for conducting a fluid which comprises a conduit having a rectilinear portion in which the flow of fluid tends to be rectilinear, means for admitting fluid into said rectilinear portion such that there is a change in the direction of flow of fluid as it enters said rectilinear portion, said rectilinear portion having immovably affixed to the inner surface thereof an airfoil having a leading edge facing into the rectilinear flow substantially at the place where the change in direction is completed and the rectilinear flow begins, upper and lower surfaces normal to said inner surface over which the fluid flows after being divided by said leading edge, said upper and lower surfaces having midportions which are planar and lie in parallel upper and lower planes and side surfaces which bridge said upper and lower surfaces and one of which is fixed to said inner surface and the other of which is spaced from said inner surface a distance which is not more than about one-fifth the diameter of the conduit at the point where the airfoil is affixed, said airfoil functioning to induce a vortex in said rectilinear portion and said rectilinear portion being free of any construction which interferes with the formation and maintenance of said vortex.

2. The fluid conduit of claim 1, in which the airfoil is characterized by said upper and lower surfaces having mid-portions which are planar and lie in parallel upper and lower planes, by the leading edge being in or slightly above the lower plane, by the upper surface sloping downwardly from the planar portion of the upper plane to the leading edge in a convex curve, by the lower surface sloping downwardly from the planar portion of the lower plane and then upwardly to the leading edge a bulbous curve, and by the upper and lower surfaces trailing downwardly from the planar portions of the upper and lower plane to the trailing edge in convex and concave curves, respectively.

3. The fluid conduit of claim 2, in which the airfoil is further characterized by the upper and lower surfaces forming angles with the lower plane at the leading edge of about 30° to about 40°.

4. The fluid conduit of claim 3, in which the airfoil is further characterized by the bulbous curve having a length equal to about ⅜ of the overall length of the airfoil, by the convex curve having a length equal to about ⅜ of the length of the bulbous curve, by the distance from the lower plane to the upper plane being about ⅜ the distance from the bottom of the bulbous curve to the upper plane, by the vertical distance from the lower plane to the trailing edge being about ⅜ the distance from the lower plane to the bottom of the bulbous curve, and by the thickness of the airfoil being substantially the same as the distance between the upper and lower planes.

5. A fluid conduit of claim 2, in which the airfoil comprising said leading edge and said upper and lower surfaces has a body portion, a head portion, a tail portion, and sides defined by parallel side planes one of which sides is affixed to said inner surface, and is characterized by the upper and lower surfaces being planar and being defined by upper and lower parallel planes having substantially the same spacing as the side planes and being normal to the side planes, by the head portion having a bulbous portion extending substantially below the lower plane, and by the tail portion turning down to a point substantially below the lower plane but not as far below as the bulbous portion.

6. The fluid conduit of claim 2, in which the means for admitting fluid into said rectilinear portion comprises a conduit portion opening into an intermediate section of said rectilinear portion at an angle thereto and in which a foil is located downwstream of the juncture of said conduit portion and said rectilinear portion and with its leading edge adjacent said juncture.

7. The fluid conduit of claim 2, in which said conduit has an open end exposed to the ambient atmosphere and a relatively short flare between said rectilinear portion and said open end and in which said leading edge is disposed adjacent the beginning of said flare.

8. The fluid conduit of claim 7, in which the means for admitting fluid into said rectilinear portion also comprises a conduit portion opening into an intermediate section of said rectilinear portion at a angle thereto and in which a foil is located downstream of the juncture of said conduit portion and said rectilinear portion and with its leading edge adjacent said juncture.

9. An airfoil comprising a body portion, a head portion, a tail portion, and sides defined by parallel side planes, and being characterized by the body portion having upper and lower planar surfaces defined by upper and lower parallel planes having substantially the same spacing as the side planes and being normal to the side planes, by the head portion having a bulbous portion extending substantially below the lower plane, by the tail portion extending substantially below the lower plane but not as far below as the bulbous portion, by the tail portion being formed by the upper and lower surfaces trailing downward to the trailing edge of the foil in convex and concave curves, respectively, and in which the upper surface slopes downwardly to the leading edge of the airfoil in a convex curve and the bulbous portion is formed by the lower surface sloping downwardly from the lower planar surface and upwardly to the leading edge, in which the upper and lower surfaces form angles with the lower plane at the leading edge of about 30° to about 40°, and in which the bulbous curve has a length equal to about ⅔ of the overall length of the foil, the convex curve has a length equal to about ⅔ the length of the bulbous curve, the distance from the bottom plane to the upper plane is about ⅔ the distance from the bottom of the bulbous curve to the upper plane, and the vertical distance from the lower plane to the trailing edge is about ⅔ the distance from the lower plane to the bottom of the bulbous curve.

10. A process for increasing the fluid flow-through in a conduit in which part of the fluid flow is rectilinear and the part of the flow immediately preceding the rectilinear flow is curvilinear, without increasing the power requirements or the size of the conduit which comprises affixing to the inner surface of the conduit an airfoil having a leading edge facing into the rectilinear flow substantially at the place where the curvilinear flow changes to the rectilinear flow, upper and lower surfaces normal to said inner surface over which the fluid flows after being divided by said leading edge, and a side surface which bridge said upper and one of which is fixed to said inner surface and the other of which lower surfaces and is spaced from said inner surface a distance which is not more than about one-fifth the diameter of the conduit at the point where the airfoil is affixed, said airfoil functioning to induce a vortex in said rectilinear portion and said rectilinear portion being free of any construction which interferes with the formation and maintenance of said vortex.

11. The process of claim 10, which further comprises affixing another airfoil to the inner surface of said conduit opposite the first named airfoil in a position and so oriented that the effect of one airfoil reinforces the other.

12. An airfoil comprising a body portion, a head portion, a tail portion, and sides defined by parallel side planes, and being characterized by the body portion having upper and lower planar surfaces defined by upper and lower parallel planes normal to the side planes, by the head portion having a bulbous portion extending substantially below the lower plane, and by the tail portion extending substantially below the lower plane but not as far below as the bulbous portion, one of said sides comprising a layer of adhesive covered by a protective sheet.

13. A fluid conduit for conducting a fluid which comprises a conduit having a rectilinear portion in which the flow of fluid tends to be rectilinear, means for admitting fluid into said rectilinear portion such that there is a change in the direction of the flow of fluid as it enters, said rectilinear portion having affixed to each of opposite inner surfaces thereof of said rectilinear portion, each said airfoil having a leading edge facing into the rectilinear flow substantially at the place where the change in direction of flow is completed and the rectilinear flow begins, each said airfoil having upper and lower surfaces exposed to the fluid flow in said conduit adjacent the periphery thereof, but not in the center portion thereof, and having a bulbous portion adjacent the leading edge which imparts asymmetry thereto, said airfoils being affixed to the inner surface in a manner such that they have the same asymmetry viewed from the center of the conduit, whereby the effect of the bulbous portion of one airfoil reinforces the effect of the bulbous portion of the airfoil opposite thereto.

14. The fluid conduit of claim 13, in which the means for admitting fluid into said rectilinear portion comprises a conduit portion opening into an intermediate section of said rectilinear portion at an angle thereto and in which the foil is located downstream of the juncture of said conduit portion and said rectilinear portion and with its leading edge adjacent said juncture.

15. The fluid conduit of claim 13, in which said conduit has an open end exposed to the ambient atmosphere and a relatively short flare between said rectilinear portion and said open end and in which said leading edges are disposed adjacent the beginning of said flare.

16. The fluid conduit of claim 15, in which the means for admitting fluid into said rectilinear portion also comprises a conduit portion opening into an intermediate section of said rectilinear portion at an angle thereto and in which the foils are located downstream of the juncture of said conduit portion and said rectilinear portion and adjacent thereto.

17. A process for increasing the airflow into an open-ended conduit having a rectilinear portion connected to the open end by a relatively short flared portion which comprises affixing to the inner surface of said rectilinear portion an airfoil having a leading edge disposed adjacent the beginning of said flare, upper and lower surfaces normal to said inner surface over which the fluid flows after being divided by said leading edge, and a side surface which bridges said upper and lower surfaces and is spaced from said inner surface a distance which is not more than about one-fifth the diameter of the conduit at the point where the airfoil is affixed, said airfoil functioning to induce a vortex in said rectilinear portion and said rectilinear portion being free of any construction which interferes with the formation and maintenance of said vortex.

* * * * *

UNITED STATES PATENT AND TRADEMARK OFFICE
CERTIFICATE OF CORRECTION

PATENT NO. : 4,310,028

DATED : January 12, 1982

INVENTOR(S) : John H. Kennedy

It is certified that error appears in the above-identified patent and that said Letters Patent is hereby corrected as shown below:

Col. 2, line 54; insert a comma -- , -- after "cleaner"
Col. 3, lines 66-68; delete "upper and lower surfaces having mid-portions which are planar and lie in parallel upper and lower planes, by the"
Col. 4, line 22; "3/8" should read -- 5/8 --
Col. 4, line 27; "claim 2" should read -- claim 1 --

Col. 4, line 40; "claim 2" should read -- claim 1 --

Col. 4, line 47; "claim 2" should read -- claim 1 --

Col. 5, line 17; "3/8" should read -- 5/8 --

Col. 5, line 28; after "lower" insert -- parallel --
Col. 5, lines 31-33; "a side surface which bridge said upper and one of which is fixed to said inner surface and the other of which lower surfaces and is" should read -- side surfaces which bridge said upper and lower surfaces and one of which is fixed to said inner surface and the other of which is --

UNITED STATES PATENT AND TRADEMARK OFFICE
CERTIFICATE OF CORRECTION

PATENT NO. : 4,310,028

DATED : January 12, 1982

INVENTOR(S) : John H. Kennedy

It is certified that error appears in the above-identified patent and that said Letters Patent is hereby corrected as shown below:

Col. 6, line 5; after "enters," insert -- an airfoil --
Col. 6, line 6; delete "said rectilinear portion having"
Col. 6, line 7; delete "thereof"
Col. 6, line 11; delete "each said airfoil having"
Col. 6, line 12; insert after "lower", -- parallel --
Col. 6, lines 13 & 14; delete "but not in the center portion thereof,"
Col. 6, line 45; insert after "lower", -- parallel --

Signed and Sealed this

Sixteenth Day of November 1982

[SEAL]

Attest:

Attesting Officer

GERALD J MOSSINGHOFF

Commissioner of Patents and Trademarks